United States Patent Office 2,996,751
Patented Aug. 22, 1961

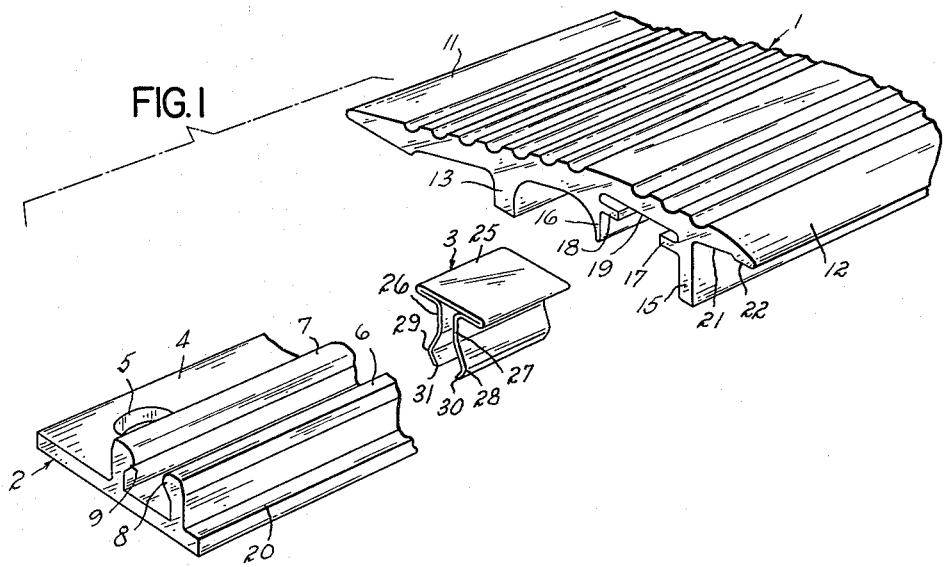
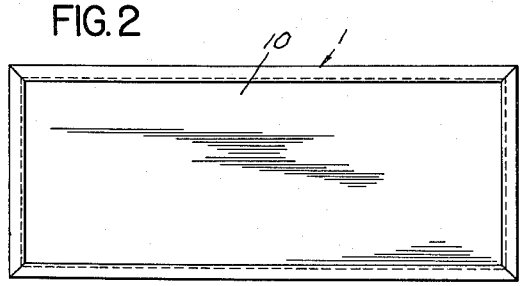
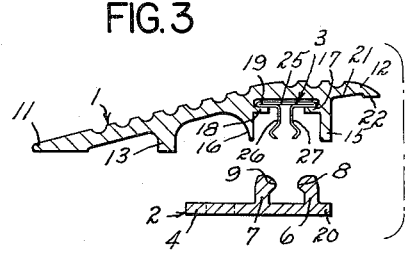
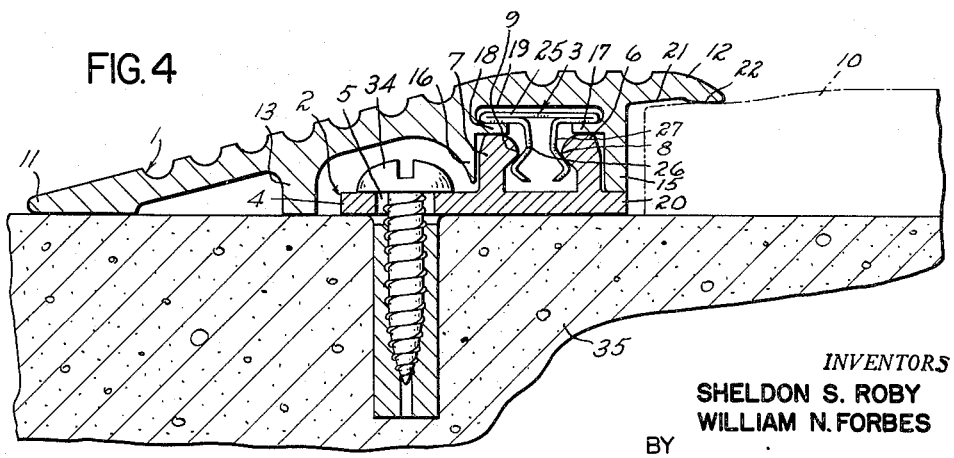
INVENTORS
SHELDON S. ROBY
WILLIAM N. FORBES

2,996,751
SNAP-ON MOLDING
Sheldon S. Roby, Meriden, and William N. Forbes, Plantsville, Conn., assignors to The Stanley Works, New Britain, Conn., a corporation of Connecticut
Filed Sept. 9, 1958, Ser. No. 759,882
3 Claims. (Cl. 16—7)

This invention relates to moldings utilized to secure mat switches and the like to supporting surfaces.

Power operated door opening and closing devices often use an electric or pneumatic mat switch to control the operation of the door. The problems associated with the installation and the repair or replacement of these switches have focused considerable attention upon the moldings which are the subject of this invention.

It is an object of this invention to provide an improved snap-on molding which is easily and economically manufactured and installed and which effectively secures and protects the mat switch edge.

It is a further object of this invention to provide an improved snap-on molding which can be disassembled without using special tools so as to conveniently expose the mat switch and molding for repair purposes.

These and other objects and features will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is an exploded perspective view of a portion of a preferred embodiment of this invention;

FIG. 2 is a schematic plan view of the molding installed with a mat switch;

FIG. 3 is a cross section of the preferred embodiment showing the constituent parts in position for assembly; and FIG. 4 is a cross section of the molding of FIG. 1 as installed on a concrete floor.

Referring to the drawings in which the preferred embodiment is illustrated as a molding usable for surface mounting of a carpet or mat switch 10, it is seen that the molding of this invention generally comprises a top member 1 provided with a grooved upper surface and overlying the edge portion of the mat switch 10, and an anchoring or base member 2 which is secured to the floor or carpet supporting surface, and a plurality of spring members 3 releasably holding the top member 1 and loose member 2 in assembled relationship. As seen in FIG. 2, the molding is disposed along the four sides of the mat switch 10 about the edge thereof and retaining the mat switch 10 in position and protecting the edge portions thereof.

As most clearly seen in FIG. 1, base member 2 is provided with mounting flange 4 having a series of longitudinally spaced apertures 5 formed therein through which a fastener may pass to secure the base member relative to the supporting surface. Parallel upstanding abutments 6 and 7 are formed integrally with base member 2 in the preferred embodiment and are provided with inwardly extending opposed shoulders 8 and 9 at their upper ends. As is apparent from its shape, the base member 2 can be extruded from a material such as aluminum.

Top member 1 has a generally tapering profile in the illustrated surface mounted embodiment so that rear edge 11 is of relatively thin cross section with its lower surface flattened to abut the floor surface and receive support therefrom, while front edge 12 extends forward to engage the upper surface of mat switch 10. The upper surface of top member 1 is provided with a series of generally parallel serrations or grooves to give better traction on this surface.

Downwardly extending rib 13 of top member 1 is provided at a point intermediate edges 11 and 12, and is of such length as to abut the floor surface when the molding is assembled so as to provide support for top member 1. Downwardly extending abutments 15 and 16 are parallel to each other and to base abutments 6 and 7, and are dimensioned to define a slot into which abutments 6 and 7 fit when the molding is assembled so as to restrain lateral movement. Adjacent the upper ends of abutments 15 and 16 are provided transversely extending and opposed projections 17 and 18 which define a generally T-shaped slot 19 and which are dimensioned to abut the upper ends of abutments 6 and 7 to provide support for top member 1 when it is assembled on base member 2. It is noted that the underside of front edge 12 is provided with a slight recess 21 thereby to define a mat gripping ridge 22. As is evident from the described construction, top member 1 is also shaped as to be easily extruded from a material such as aluminum.

Spring clip 3 is formed from a strip of tempered spring steel in the preferred embodiment and is shaped to define head portion 25 and legs 26 and 27. Legs 26 and 27 are generally parallel and have outwardly bowed portions 28 and 29 which terminate in inwardly bent ends 30 and 31. Head portion 25 is generally T-shaped and is dimensioned to fit within slot 19 in top member 1. Legs 26 and 27 are of such length that outwardly bowed portions 28 and 29 embrace the undersides of shoulders 8 and 9 on base abutments 6 and 7 when abutments 17 and 18 of top member 1 are in engagement with the upper ends of abutments 6 and 7. Inwardly bent ends 30 and 31 serve to cam legs 26 and 27 together when clip 3 is pushed down into engagement with abutments 6 and 7 thereby allowing outwardly bowed portion 28 and 29 to pass between shoulders 8 and 9.

As seen in FIGS. 3 and 4, assembly of the molding involves the anchoring of base portion 2 to floor surface 35 by threaded fastener 34 so that lip 20 is adjacent the desired edge position of the carpet. Top member 1 is positioned over base member 2 in the approximate position shown in FIG. 3 so that spring clip 3 (either a single continuous clip or a distributed series of clips) is in approximate alignment with abutments 6 and 7. Downward pressure is then exerted on top member 1 thereby forcing spring legs 26 and 27 together so that outwardly bowed portions 28 and 29 slip past shoulders 8 and 9 and into engagement with the underside of shoulders 8 and 9. In the assembled position, rear edge 11 abuts the concrete floor as does intermediate rib 13. Projections 17 and 18 abut the top of abutments 6 and 7 and ridge 22 of front edge 12 engages and slightly compresses the edge of the mat 10 (shown in dotted lines in FIGS. 2 and 4) so as to retain the carpet in position.

Top member 1 can be separated from base member 2 simply by prying top member 1 in an upward direction so that spring clip legs 26 and 27 are cammed inwardly by the engagement of outwardly bowed portions 28 and 29 with the sloping underside of shoulders 8 and 9 to release spring 3 from engagement with base member 2.

From the foregoing disclosure, it is evident that this improved mat switch molding provides a structure which is economical to manufacture, such as by extrusion of aluminum. In addition, the molding of this invention utilizes a separate spring which is not only effective to restrain movement between the top and base members when they are in engagement but also which can be easily replaced in the event of damage without necessitating the replacement of either top or base member. The mode of attachment for the spring clip to the top member as well as the assembly of the top member to the base requires no tools and utilizes effective and troublefree molding construction features.

As many variations could be made in the above construction and different embodiments of this invention can be made by one skilled in the art, such variations and embodiments are intended to be included within the scope of the invention.

We claim:

1. A detachable molding for releasably retaining a mat switch on a supporting surface, said molding comprising a base member adapted to be anchored to a supporting surface along the edge of said mat switch, a top member extending longitudinally of the base member and supported thereby, said top member having a longitudinal edge portion extending laterally of the base member for engagement with the edge of a mat switch, a longitudinally extending abutment of irregular cross section carried by one of said members and extending toward the other of said members, a longitudinally extending T-shaped slot in the other of said members, a plurality of spring members having head portions slidably received in said T-slot, and having flexible spring fingers engageable with said abutment and means carried by the other of said members and engageable with said abutment for precluding lateral movement of said top member relative to said base member.

2. A carpet molding comprising a base member adapted to be secured to a floor, a pair of spaced parallel upstanding abutments formed in said base member, said abutments having inwardly directed shoulders formed at their upward ends, a top member, a pair of depending top abutments dimensioned to engage the top and outer sides of said base abutments and defining a T-shaped slot therebetween, and a plurality of spring clips having head portions slidably secured in a T slot intermediate said depending top abutments, said spring being shaped to engage the underside of said base abutment shoulders in a complementary manner.

3. A carpet molding comprising a base member adapted to be secured to a floor, said base member having a pair of spaced parallel upstanding abutments formed therein, an inwardly directed shoulder formed in the upper end of each base abutment, a top member having first and second longitudinal edges, said first edge being engageable with the floor surface and said second edge being engageable with the carpet, a pair of parallel depending abutments on said top member and defining a generally T-shaped slot therebetween, each of said abutments being dimensioned to engage the upper and outer side surfaces of one of the base member abutments, and a plurality of spring clips having a T-shaped head portion retained in said slot, each of said springs having outwardly bowed depending legs dimensioned to engage the lower surface of said base shoulders in a complementary manner.

References Cited in the file of this patent

UNITED STATES PATENTS

| 1,905,603 | Place | Apr. 25, 1933 |
| 2,084,624 | Place | June 22, 1937 |
| 2,084,717 | Wiley | June 22, 1937 |
| 2,449,904 | Lorraine | Sept. 21, 1948 |
| 2,807,826 | De Vault | Oct. 1, 1957 |